H. C. McBRAIR.
TRANSMISSION GEARING.
APPLICATION FILED NOV. 21, 1911.
1,125,358.
Patented Jan. 19, 1915.
3 SHEETS—SHEET 3.
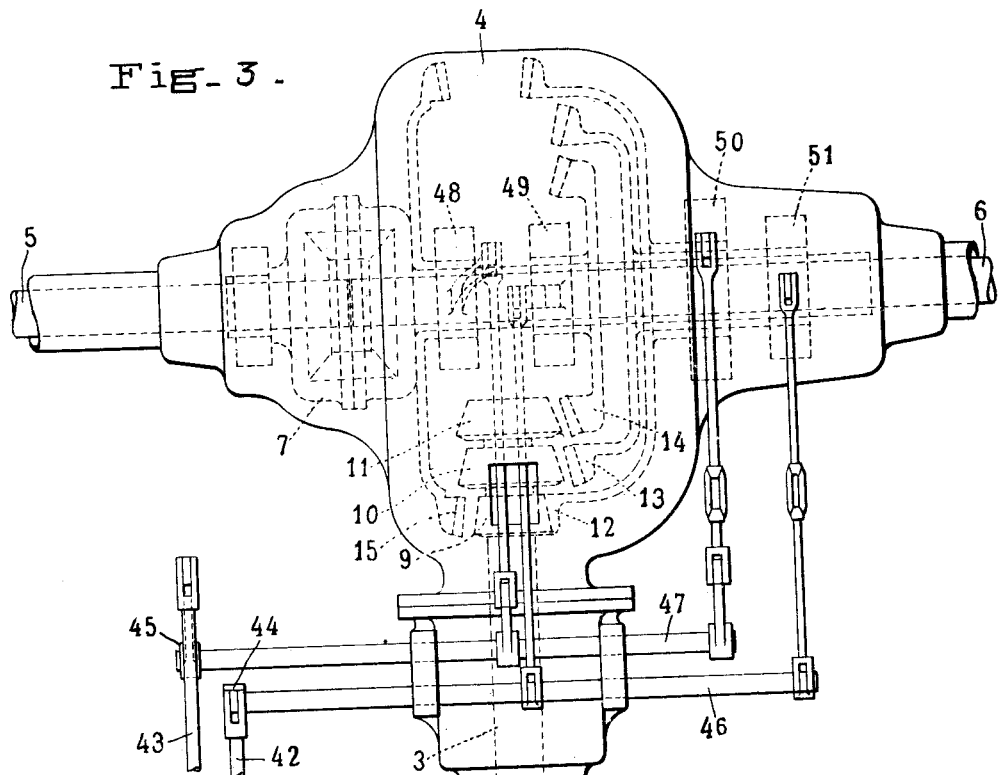
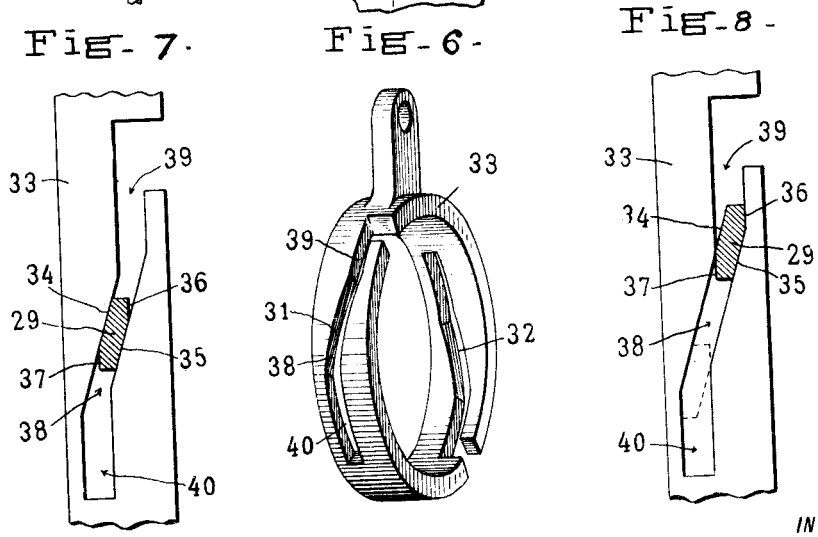
INVENTOR
Henry C. McBrair,
WITNESSES
ATTORNEY

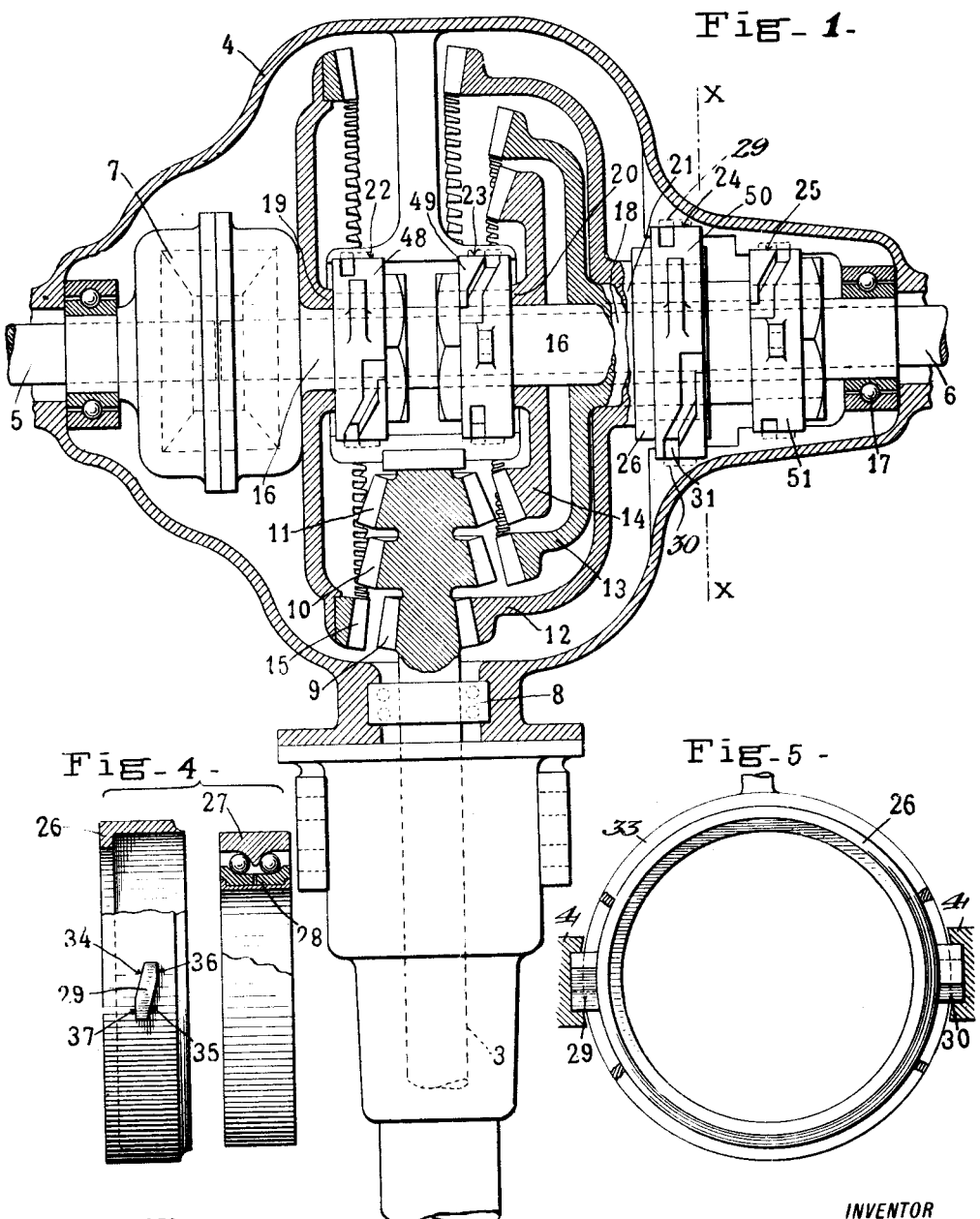

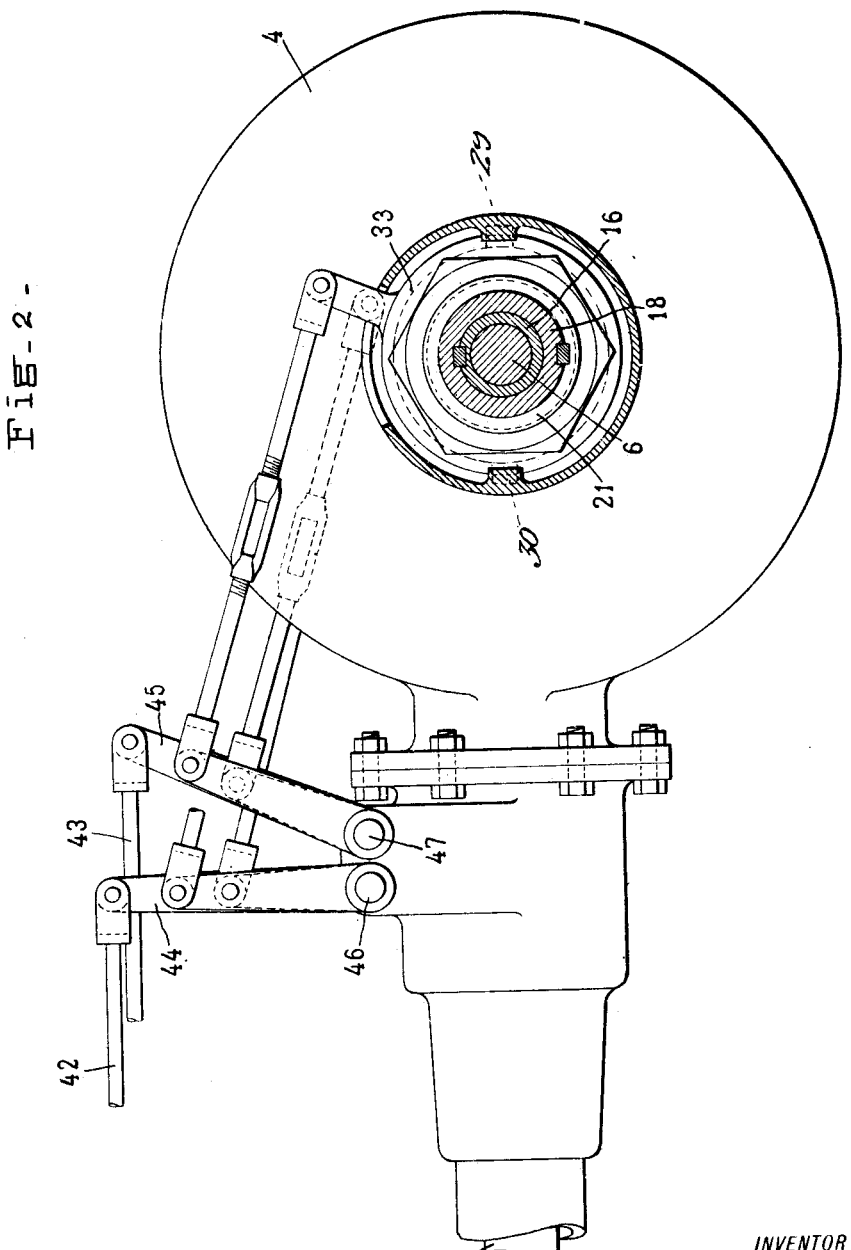

UNITED STATES PATENT OFFICE.

HENRY C. McBRAIR, OF MIDDLETOWN, NEW YORK, ASSIGNOR TO DIRECT DRIVE GEAR COMPANY, OF PATERSON, NEW JERSEY.

TRANSMISSION-GEARING.

1,125,358.  Specification of Letters Patent.  Patented Jan. 19, 1915.

Application filed November 21, 1911. Serial No. 661,611.

*To all whom it may concern:*

Be it known that I, HENRY C. McBRAIR, a citizen of the United States, and a resident of Middletown, in the county of Orange and State of New York, have invented certain new and useful Improvements in Transmission-Gearing, of which the following is a full, clear, and exact description, whereby any one skilled in the art may make and use the same.

The invention relates to transmission mechanism and particularly to a transmission gearing especially adapted for automobile uses.

It embodies some of the salient features of a co-pending application entitled Variable speed gearing, Serial No. 534,468, filed Dec. 22, 1909, and has the additional improvement of a shifting device which will positively shift the various gears without frictional losses and will effect a locking of the various gears in any desired position.

The object of the invention is to provide in conjunction with transmission gearing a simple, positive and effective shifting and locking mechanism which will assure proper intermeshing of the various gear couplets.

A further object is to provide a shifting and interlocking mechanism for a transmission mechanism which will be effective upon purely rotary movements.

The invention is for convenience illustrated in connection with an automobile transmission mechanism.

Referring to the drawings: Figure 1 is a partial horizontal section through the rear axle and appurtenant gearing. Fig. 2 is a cross-sectional view through the axle on the line x—x of Fig. 2, illustrating the connections and links of the shifting device. Fig. 3 is a top-plan view of the gear casing as mounted upon the rear axle. Fig. 4 is an edge view partially broken in section of one of the shifting ring members and the anti-friction bearing used therewith, the parts being arranged side by side in position for assembly. Fig. 5 is a front elevation of the shifting ring illustrated in Fig. 4. Fig. 6 is a detail perspective view of the shifting ring member which coöperates with the ring member of Fig. 4. Figs. 7 and 8 are diagrammatic views on enlarged scale illustrating the camming action of the shifting ring members.

Referring to the drawings, the invention is illustrated in connection with the rear axle of an automobile. In said drawings, 3 denotes the main driving shaft which is suitably supported and extends rearwardly to the casing 4 of the rear axle which, in this instance, has arranged within it transmission gearing.

The axle is of the divided type having sections 5, 6, coupled through a differential gearing 7, not specifically illustrated herein.

Extending within the housing 4, is the main shaft 3, suitably supported in anti-friction bearings 8, and having secured thereto pinions 9, 10, and 11. These pinions are arranged to mesh respectively with driven gears 12, 13, 14, to give a forward motion at different speeds to the driving axle.

There is also a reversing gear 15, which may be brought into mesh with the pinion 9. The gear couplets 9, 12, represent the low speed while the gear couplets 11, 14 represent the high speed and in any arrangement of gear couplets there is always a positive drive from the main driving shaft to the driven shaft with all other gear couplets out of mesh. Thus, there is a direct drive for each speed.

The reversing gear 15, is secured to the sleeve 16, of the differential gearing 7, which sleeve is suitably supported at one end of the casing 4 in ball bearings 17. Secured to, but axially movable upon the sleeve 16, in the same manner as the reversing gear 15, are the gears 14, 13, while the gear 12 is splined to a sleeve 18, extending from the gear 13.

The reversing gear 15, and the high speed gear 14 have sleeves 19, 20, extending toward each other and surmounted by shifting devices hereinafter described. Similar shifting devices are arranged upon the sleeve or hub 18 of the gear 13, and upon the sleeve or hub 21, of the gear 12. The same type of shifting device is used for each of the gears and is adapted to move said gear axially of the supporting shaft or sleeve and lock it in definite position after movement. The only difference in the shifting devices is in the position and lead of the cam slots of the shifting rings.

In Figs. 4, 5, 6, 7 and 8 the shifting mechanism applicable to each of the gears is illustrated, and in each instance, the rotary members of the shifting devices are held against axial movement by the grooves suitably formed in fins or webs extending from the casing. These fins or webs are grooved to hold the rotary members against axial movement as illustrated at 22, 23, 24 and 25.

Referring to Figs. 4 to 8 inclusive, there is illustrated a shifting ring 26, which surrounds and is secured to the outer race ring 27, of a ball bearing, the inner ring 28, of which is non-rotatively secured to the sleeve or hub of the gear to be shifted. This ring 26, has extending from substantially diametrically opposite sides cam lugs 29, 30, which project through cam slots 31, 32, in a rotary shifting member 33. These lugs are formed with angularly disposed sides 34, 35, and parallel straight sides 36, 37. Each of the cam slots of the rotary shifting rings 33, likewise has an angularly disposed opening 38, which, at either end, terminates in straight slots 39, 40. It follows that when the lugs 29, 30, occupy a position in the straight portions of the slots 39, 40, their straight sides 26, 27, will rest against the side walls of the slots and maintain them against lateral movement.

Whenever the rotary member 33, is moved, the lugs 29, 30, will cause the shifting ring 26, and the contained bearing and gear to move axially of the supporting shaft due to the cam openings 31, 32. The lugs 29, 30, are extended through the cam slots of the rotary rotating ring 33, and into the fixed part of the casing as illustrated in Fig. 6. Therefore, the rings 26, are non-rotary but may move axially of the shaft.

With the arrangement as shown, a single lever is utilized to control the position of the various movable gears and when used on an automobile, the well-known and almost universally used type H lever control may be used.

Referring to Figs. 3 and 4, a suitable operating lever (not shown) is operatively connected with links 42, 43. These in turn, through levers 44, 45, actuate short shafts 46, 47. These shafts are connected through suitable levers and links with the several rotary shifting members illustrated in Fig. 7, and shown in position upon the several gears at 48, 49, 50, 51.

As illustrated the rotary shifting member 48 of the reversing gear 15, and the rotary shifting member 50, of the low speed gear 12, are interconnected so that opposed movements of the lever may bring either of said gears into meshing position with the pinion 9, and insuring the disconnection of one gear before the engagement of the other. Similarly, the rotary shifting member 49, of the gear 14, and the rotary shifting member 51, of the gear 13, are interconnected so that a single backward and forward movement of the lever will give proper intermeshing engagement of the intermediate speed gear 13, with its pinion 10, or the engagement of the high speed gear 14, with its pinion 11.

From the above, it is apparent that there must be a separation of gears of one couplet before there is an engagement of the gears of another couplet.

The advantages of the shifting device, in connection with the arrangement of gears is apparent. Either of the gears may be shifted into and out of meshing position by a simple rotary movement of the rotating shifting ring 33. This ring having a double ball bearing within it and between it and the gear to be shifted, will move freely and without friction and when located at either extremity of the cam slot, will be locked in place without liability of creeping and without requiring said retaining device or locks upon the operating levers. No quadrants or inter-locks are required in conjunction with the operating lever and the shifting of the gears may be effected with the greatest ease. The cam slots gradually carry the gear forward into mesh and out of mesh and the anti-friction bearings relieve all side thrusts and prevent the tendency of creep between the rotary operating ring and the shifting ring member.

Obviously, the exact details of construction of cam slots might be varied to a considerable extent without departing from the spirit or intent of the invention.

What I claim as my invention and desire to secure by Letters Patent is:

1. A transmission gearing embodying a casing, a driven shaft mounted therein, a driving shaft having a bearing in said casing, beveled pinions permanently secured upon said driving shaft, said shaft being non-movable in an axial direction, beveled gears axially movable upon the driven shaft, each of said gears provided with a rotary shifting device comprising a ball race secured to the gear, a coöperating ball race held against rotary movement and a rotary ring held against axial movement and having a slot and cam connection with the ball races whereby the gear may be axially moved toward and away from its pinion upon the driving shaft.

2. In a transmission gearing, a casing, a divided shaft having bearings in said casing, a differential mechanism intermediate the sections of said divided shaft, a driving shaft, a series of pinions permanently secured to said shaft, a series of gears axially movable with reference to the divided shaft, ball races operatively arranged on the hubs of each of said gears, coöperating ball races non-rotatively mounted with reference to the gears though axially movable therewith and rotary means for axially moving either of said gears and ball races.

3. In a transmission gearing, a casing, a divided shaft having bearings in said casing, a differential mechanism intermediate the sections of said divided shaft, a driving shaft, a series of pinions permanently secured to said shaft, a series of gears borne upon and axially movable with reference to the divided shaft, ball races operatively arranged on the hubs of each of said gears, coöperating ball races non-rotatively mounted with reference to the gears though axially movable therewith, rotary means for axially moving said gears and ball races, said means including devices for insuring proper intermeshing movements of the gears with reference to the fixed pinions and means for actuating said device and rotary means.

HENRY C. McBRAIR.

Witnesses:
KATE BRENNER,
FRANCIS COLETY.

Copies of this patent may be obtained for five cents each, by addressing the "Commissioner of Patents, Washington, D. C."